Dec. 17, 1929.  E. T. FERNGREN  1,739,959
WIDTH MAINTAINER
Filed Dec. 1, 1924   2 Sheets-Sheet 1
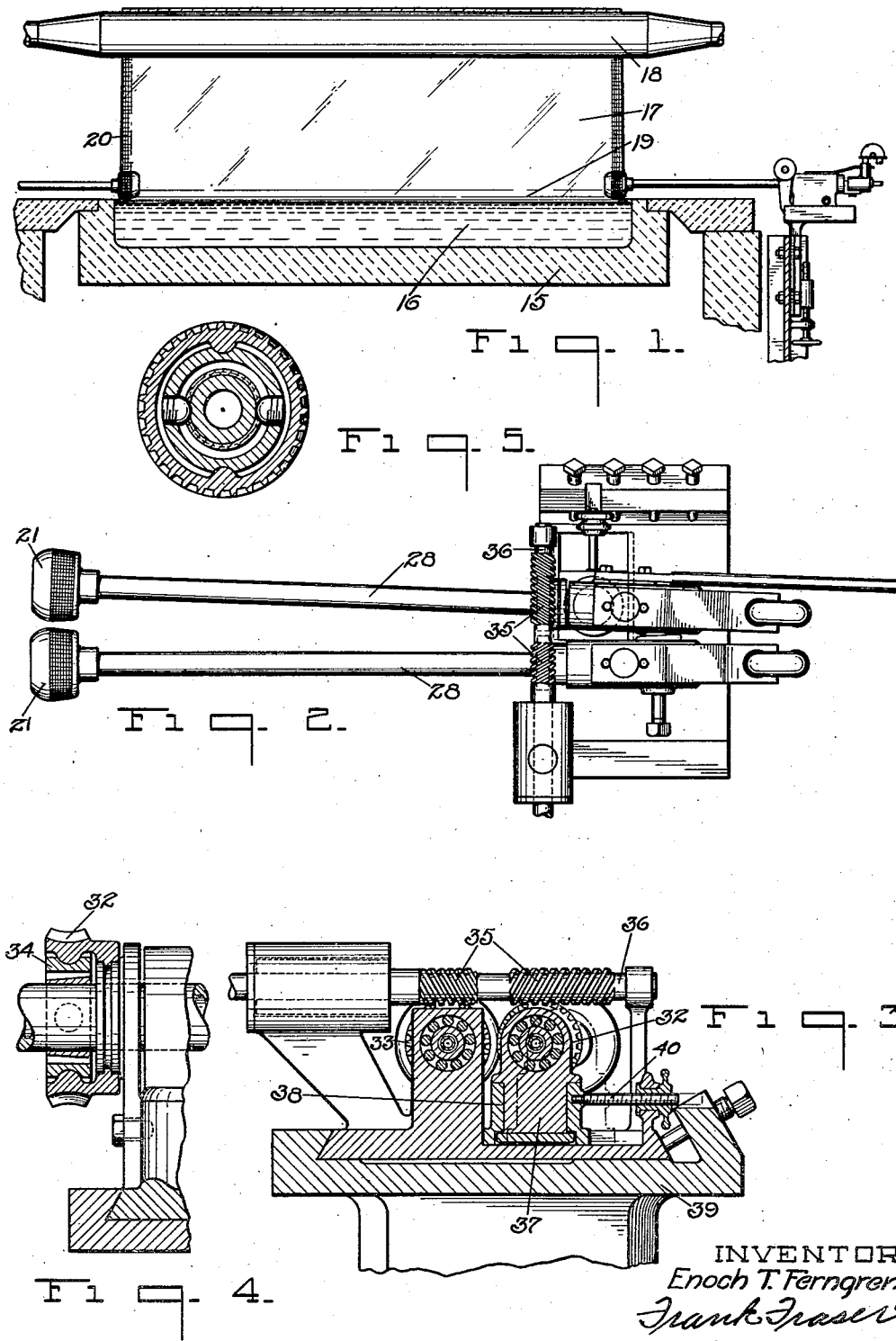
INVENTOR.
Enoch T. Ferngren.
Frank Fraser
ATTORNEY.

Dec. 17, 1929.　　　E. T. FERNGREN　　　1,739,959
WIDTH MAINTAINER
Filed Dec. 1, 1924　　　2 Sheets-Sheet 2
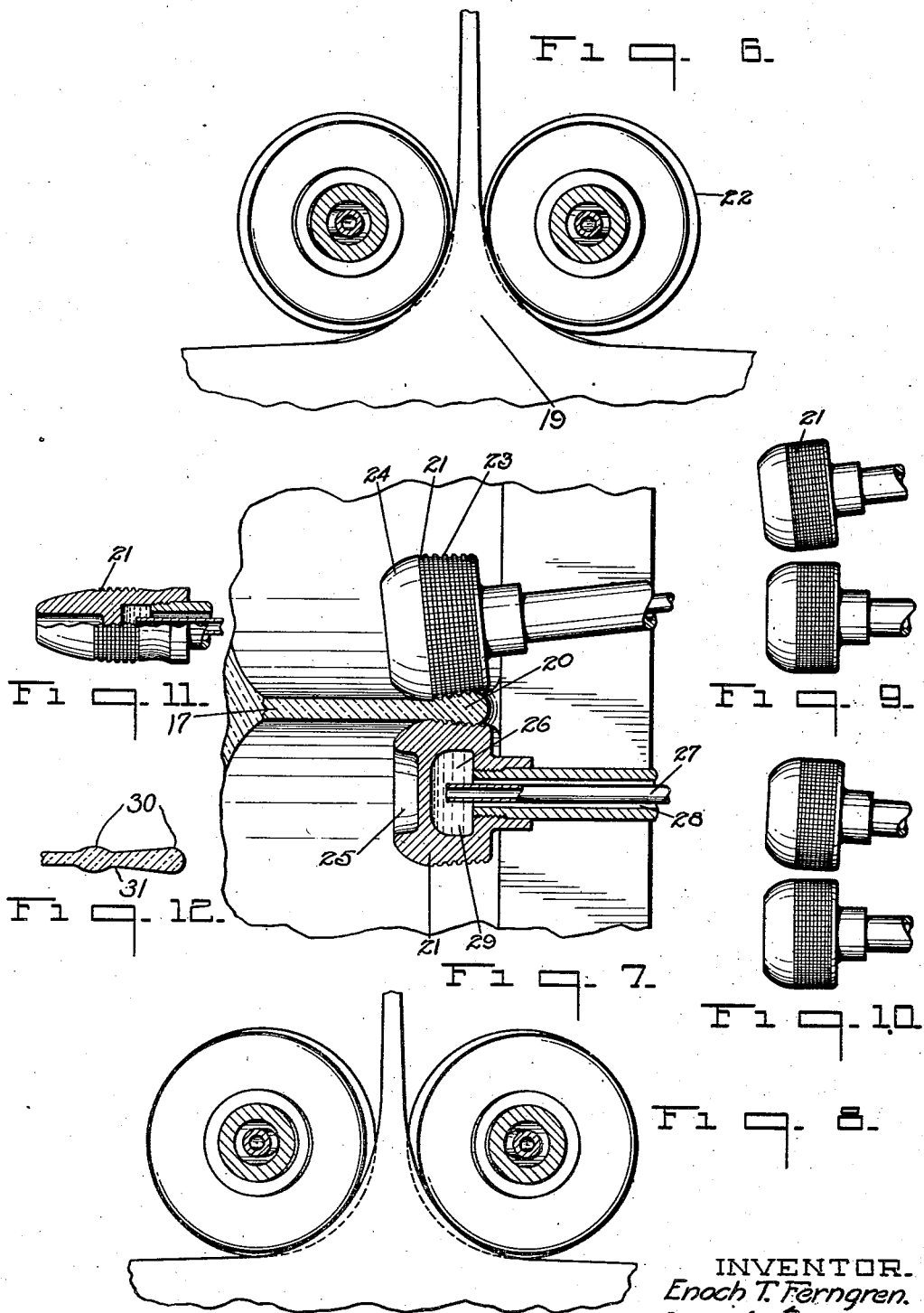
INVENTOR.
Enoch T. Ferngren.
Frank Fraser
ATTORNEY.

Patented Dec. 17, 1929

1,739,959

UNITED STATES PATENT OFFICE

ENOCH T. FERNGREN, OF TOLEDO, OHIO, ASSIGNOR TO LIBBEY-OWENS GLASS COMPANY, OF TOLEDO, OHIO, A CORPORATION OF OHIO

WIDTH MAINTAINER

Application filed December 1, 1924. Serial No. 753,108.

The present invention is an improvement in the art of drawing sheet glass, and relates more particularly to a method and apparatus for maintaining the width of the sheet, and to means for making it possible to produce a wider sheet.

While this invention is not limited to use with any one system of producing sheet glass, it is here illustrated in connection with an apparatus of the general type set forth in the patent to Colburn, 1,248,809, granted December 4, 1917. In this system a continuous sheet of glass is drawn upwardly from a bath of molten glass and then while still in a semi-plastic condition, although substantially set in its final sheet form, is bent into a horizontal plane and carried off through a suitable drawing and flattening mechanism and into a leer. As is well-known in the art, some means must be provided to maintain the width of the sheet drawn, otherwise it will gradually narrow away until no sheet is left. The prior art structures make use of so-called knurled rollers which are usually positioned in the meniscus at its opposite ends by which the sheet is prevented from narrowing according to its normal tendency. These knurled rollers have however made it necessary to cut off a substantial width of sheet section from the finished sheet due to the fact that the combined action of the rollers and the supplemental air cooling normally employed causes a thickened portion to extend inward on the sheet a substantial distance from the edge so that it is necessary to remove this thickened portion before obtaining net width of the desired thickness of sheet.

An important object of the invention is to provide an improved type of roller for use in connection with sheet glass drawing apparatus which is adapted to maintain the width of the sheet desired while at the same time it will cut down to a considerable extent the amount of glass that heretofore has been removed as above pointed out.

A further object of the invention is to provide rolls for use in sheet glass apparatus which have a diameter of sufficient size to produce an outer surface of substantially the same curvature as the normal curvature of the sheet source.

A still further object of the invention is to provide a roll of this nature which has a diameter sufficiently large enough to permit the rolls to engage the sheet supplying source substantially up to such a point in the time of draw thereof where the said sheet suppyling source has an approximate linear advance before it merges into the sheet thickness.

A still further object of the invention is to provide width maintaining means for use in sheet glass apparatus whereby the edge portions of the sheet being formed are built up in a manner to hold the sheet to width by passing or moving the border glass forward between rolls which have a peripheral speed substantially the same as the speed of the adjacent glass which is being moved in the line of draw.

Still another object of the invention is to provide rolls for use as width maintainers in sheet glass apparatus having a cupped end suitable for entrapping heat currents present around the surface of the glass from which the sheet is being drawn to prevent the cooling action of the rolls extending throughout the entire length thereof, thus making it possible to accurately control the width of the thickened portion formed on the sheet to hold the same to width.

Other objects and advantages of the invention will become apparent during the course of the following description.

In the drawings wherein like numerals are employed to designate like parts throughout the same:

Fig. 1 is a fragmentary sectional view of one type of sheet drawing apparatus illustrating the invention in use.

Fig. 2 is a top plan view of the width maintaining means in one form of mounting therefor.

Fig. 3 is a fragmentary transverse section thereof.

Fig. 4 is a sectional detail of the drive used.

Fig. 5 is another sectional detail thereof.

Fig. 6 is an end view of the knurls illustrating their position when in use.

Fig. 7 is a top plan view of the rolls, one of which is in section for the purposes of illustration.

Fig. 8 is a view similar to Fig. 6, showing the rolls pointed in opposite directions.

Figs. 9 and 10 show diagrammatic various positions in which the knurls may be placed.

Fig. 11 is a view of a slightly modified form of roll which may be used.

Fig. 12 illustrates the shape of the sheet edge which is formed.

In the drawings the numeral 15 designates a draw-pot which is formed from a suitable refractory material and contains therein a mass of molten glass 16. The pot 15 is usually supported upon a plurality of stools and is also heated by means of gas burners from the bottom to keep the glass in condition for drawing purposes, but this construction is not illustrated. The sheet 17 is drawn from the molten mass 16, and is run a short way in a vertical plane, and as is shown is then bent over a bending roll 18 and is passed through suitable drawing mechanism and an annealing leer.

In the prior art to prevent the sheet 17 from becoming narrower and narrower until finally no sheet is left, cylindrical so-called knurled rollers are employed and are positioned at the ends of the meniscus 19 to mechanically retard and build up a thickened edge portion 20 to hold the sheet to the desired width. The prior art knurled rollers will function as width maintainers, but they have several objectionable features in that, due to their action upon the glass, they create a thickened sheet body section next to and inside of the regular edge portion 20 which does not end abruptly but which tapers out for a considerable distance toward the inner sections of the sheet, thus making it necessary to remove a considerable width of glass from both sides of the sheet when cutting to get a sheet of the desired thickness. Also the uniform cylindrical shape given to most types of prior art edge forming dies or rollers makes for a substantially like peripheral speed and pressure against the edge forming glass at the point of its advancement or release by or from said rollers. This causes the formation of a knurled edge border which is relatively thin as compared to the thickened sections before mentioned, which difference makes for much irregular contraction and expansion during the cooling period of the sheet, and causes considerable loss on the slightest provocation through the warping and breaking of the sheet while in transit through the leer.

The low point of operation which is necessary for a prior art roller, if it is to function in a useful manner, also is a disadvantage resulting in contraction in width of sheet and a wave condition across its forming zone proper, due to that at the point at which it is made the edge of sheet must necessarily be driven forth by the rollers at a speedier ratio than the glass forming the adjacent drawn portion of the base of the sheet where the relative speed progression of the glass in the direction of draw is very slow, which relationships cause the partly chilled knurled edge as it comes into being and is driven forth from the gripping point of the rollers to angle or curve over toward the most adjacent sheet section in the making below the sheet area proper and above the base of the sheet, which means a loss in sheet width at each edge of the sheet and a loss of tension both lengthwise and crosswise of the sheet area.

The reason why the rollers of the prior art cannot be driven at a slower peripheral speed at the point at which they are operated to produce a condition where the knurled edge, instead of being driven forth, would be pulled out by the drawing force from between the gripping point of the rollers, resides in that the edges of sheet would stretch entirely too thin and would thus cause breakage of sheet, and that the general retardment of the glass advance supplying the line of draw adjacent the edges of the sheet attracts the glass from the center of the sheet towards its edge portion and causes the sheet to draw thin centrally, and that when the glass movement is thus restricted at the edges by slow moving rollers and not along the base of the sheet area, the glass finally pulls out of the grip of the knurled rollers being supplied to the edge portions of the sheet from adjacent points where the resistance to the glass movement is less.

On the other hand if the rolling dies of the prior art are operated at the edges of the drawn glass formation where the drawn speed of the glass at the point of grip of the rollers would be about the same as the peripheral speed of the rollers, which as now practiced is about one-fourth of the speed of the sheet, the edge glass invariably pulls out of the rolling dies or knurls at intervals of a few minutes, making such operation impossible.

An important object of this invention is to cut down to a considerable extent the amount of glass which has heretofore been wasted when forming the border portions 20, but at the same time it is also an object to build a thicker edge on the sheet, and one in which its thicker and thinner portions are so related to each other and to the glass sheet body as to carry forward sufficient heat to prevent breakage in the leer, while at the same time being strong and stiff enough to hold the stressing glass to full width at the points of its tapering progression toward fixed thickness of sheet formation.

As is shown clearly in Figs. 6 and 7, rolls 21 are employed for the purposes of building up the border portion 20 on the sheet 17. I have designed the rolls 21 in a manner that the diameter thereof is sufficiently large to produce an outer curvature 22 as shown in Fig. 6 which is substantially the same curvature as the normal curvature of the meniscus or sheet-supplying source 19. As is shown, the rolls 21 bite into the glass a slight bit, but are not submerged to the extent that the present type of knurls are. By increasing the diameter of the knurled rollers it is possible to grip or remain in contact with the glass a greater length of time with the sheet-supplying meniscus 19 than has heretofore been possible. It is necessary to keep the knurled rollers down at the base of the meniscus as shown in Fig. 6, and it is possible to do this with the rolls as shown while at the same time it is also possible to keep the knurled rolls in contact with the glass to a point where the sheet-supplying meniscus is substantially merged into the sheet thickness.

The glass near the top of the meniscus is moved more rapidly than the glass lower down nearer the base due to the difference in quantity present. With the present form of rolls it is possible to get a peripheral speed which is substantially the same speed as the adjacent glass. In other words, the glass leaving the knurled rolls is moving at substantially the same speed as the speed of the draw of the sheet. This is a decided advantage over the prior art structures in that no strains or over-supply of glass is introduced into the sheet being formed.

The rolls 21 are preferably provided with an outer slightly tapered knurled portion 23 and an inner curved reduced end 24. The reduced end is cupped out or recessed as at 25. As is shown in Fig. 7, the rolls 21 are internally cooled by a cooling medium 26 introduced through the pipe 27 and carried off by the pipe 28 housing the pipe 27. A quantity of the cooling medium is at all times within the knurled roll 21, in the chamber 29. The cooling medium is used to prevent overheating of the knurled rolls and also to absorb heat from the border portions of the sheet so that the said border portions will be sufficiently viscous to maintain and hold the sheet to width. However with the use of the knurled rolls here described, it is possible to build up a good heavy uniform border portion which does not necessarily have to be wide. In fact, it is one of the important objects of this invention to keep the border portion relatively narrow so that but a relatively narrow edge strip of the drawn glass will have to be removed when cutting up the sheet for use. To restrict the cooling action to the extreme border sections of the sheet 17, the cupped ends 25 are provided. These cupped ends or recessed ends form a pocket for the reception of heat currents which are present around the surface of the glass from which the sheet is being drawn. The heat currents will have a tendency to counteract the cooling action of the cooling medium in the chamber 29, and will prevent cooling of the entire roll. The progressively reduced area of actual contact which is had with the glass toward the most forward impression point of the cupped or open walled section of the knurls or rollers will correspondingly reduce the heat absorption from the glass toward the edge or rim of the blunt curved wall of the cupping of each roller, at which locality, as heretofore pointed out, the heat absorbing and conducting capacity of each roller is at its minimum, resulting in that the glass which is subject to the rolling touch of the cupped ends of knurls will build up a slight beaded or thickened portion which will run along the inner side of the knurled section adjacent to the thinner portion of the edge which is formed where the rollers exert their greatest pressure against the glass. Of course this heating action at the end will not materially interfere with the cooling action of the extreme border section of the sheet, but will prevent the cooling action from spreading out over a considerable distance. Even though the glass going into the sheet should come in contact with the end 24 of the roll, it would not cool the glass sufficiently to cause it to build up a heavy edge, and for this reason the heavy edge 20 formed on the sheet will be restricted to substantially that portion of the sheet which comes in contact with the cool area of the roll 21. The shape of edge which will be formed by this type of knurled roller is illustrated in Fig. 12, showing the two thick or hot zones 30 which are relatively hotter than the portion 31 due to their difference in size. The heat zones or thick portions 30 will tend to neutralize the cold portion 31, thus preventing to a great extent breakage of the sheet during the rest of its treatment. The outer thick portion 30 is formed between the knurled sections on the rolls, while the smaller inner enlarged section is formed by the reduced end 24 of the rolls as is clearly shown in Fig. 7. It will be seen that the knurled roll 21 will have its greatest peripheral speed at the joinder of the knurled surface and the smoothed surface, while at the same time less glass will be fed up through these points.

The rolls 21 may be mounted in any desired manner so that they can be toed in as in Fig. 9, or toed out as in Fig. 10. The type of edge and size of edge can be controlled by the relative positions of the rolls as well as by the speed at which they are driven. In Figs. 2 and 3 is shown one embodiment of mounting which may be used. In this form the pipes or tubes 28 extend a substantial distance from the drawpot 15, and have carried thereon gear wheels 32 and 33. The gear wheel 32 is carried by a universal connection 34 so that the tube 28 can be moved relatively to the same. The gear wheels 32 are adapted to mesh with the worms 35 carried on a transverse power shaft 36. As is shown the worm 35 meshing with the gear 32 is relatively longer than the other so that the tubes 28 can be moved to and from each other without interfering with the driving thereof. In this embodiment the tube carrying the gear 32 is mounted on a post 37 rotatable in a sleeve 38 which is carried on a slide 39. By manipulating the shaft 40 the sleeve and shaft 37 and 38 respectively can be moved to separate or bring closer the tubes 28, thus regulating the relative positions and angles of the two knurled rollers 21.

In operation, it is desirable that the diameter of the knurled rollers 21 be of such a size that the outer surface will have a curvature substantially the same as the natural curvature of the sheet supplying meniscus so that the said roll will be in contact with the meniscus to a point substantially where it merges into sheet thickness. The rolls are also driven at a speed, and due to their size wherein the peripheral speed will permit the glass to leave the rolls at a speed that is substantially the same as the speed of draw of the sheet. Due to the speed of the rolls and the temperature controlling action of the cupped end 25, it is possible to maintain the sheet to width without making it necessary to cut off a considerable width of the sheet. By using the cupped knurled rolls as described, the edge 20 which is formed on the sheet, will be relatively thick, heavy and narrow. The cupped end 25 can be made in any design or can be modified to give the best results, but it is to be understood that the utilization of the heat currents from near the surface of the sheet glass in the drawpot will considerably aid in preventing the thickened edge 20 from spreading out toward the center of the sheet.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In sheet glass drawing apparatus, means for drawing a flat sheet of glass from a mass of molten glass, and rotatable rolls acting on the side of the sheet at the edges thereof near its source, said rolls having a diameter sufficiently large to produce an outer surface having substantially the same curvature as the curvature of the sheet source and located substantially concentric to the curvature of the sheet source.

2. In a sheet glass drawing apparatus, means for drawing a flat sheet of glass from a mass of molten glass, and rotatable rolls engaging the edges of the sheet at its source, each of said rolls having a recess in one end for receiving a portion of the heat currents given off from the molten glass from which the sheet is drawn.

3. In a sheet glass drawing apparatus, means for drawing a flat sheet of glass from a mass of molten glass, and means for holding the sheet to width, comprising rotatable rolls engaging the edges of the sheet near its source, each of said rolls having a cupped end.

4. In a sheet glass drawing apparatus, means for drawing a flat sheet of glass from a mass of molten glass, and means for holding the sheet to width, comprising rotatable rolls engaging the edges of the sheet near its source, a portion of said rolls having a knurled surface, one end of said rolls being reduced in diameter, and having a recess formed therein.

5. In a sheet glass drawing apparatus, means for drawing a flat sheet of glass from a mass of molten glass, and means for holding the sheet to width, comprising rotatable rolls, the peripheral speed being such that the glass leaving the rolls will have substantially the same speed at which the adjacent glass is drawn, means to cool the rolls, and means to restrict the cooling to the outer portions thereof.

6. In a sheet glass drawing apparatus, means for drawing a flat sheet of glass from a mass of molten glass, and rolls engaging the edges of the sheet near its source for building up a relatively heavy edge portion to hold the sheet to width, the peripheral speed thereof being such that the glass at the point where it leaves the rolls will have substantially the same speed as the speed of draw of the sheet, means to adjustably mount the rolls for rotation, means to chill the rolls to assist in building up said edge portion, and means to restrict the cooling action of the rolls upon the sheet to produce a relatively narrow thickened edge portion on said sheet.

7. A roll for use in sheet glass apparatus having a recess therein in the end opposite to the end by which said roll is supported.

8. A roll for use in sheet glass apparatus having a relatively large diameter, and having a recess therein in the end opposite to the end by which said roll is supported.

9. A roll for use in sheet glass apparatus having a slightly tapered knurled portion, and having a recessed end at the opposite end to which the roll is supported.

10. A roll for use in sheet glass apparatus having a slightly tapered knurled portion, and having a curved reduced end opposite thereto, said end having a recess formed therein.

Signed at Toledo, in the county of Lucas, and State of Ohio, this 29th day of Nov., 1924.

ENOCH T. FERNGREN.